United States Patent [19]

Maekawa et al.

[11] Patent Number: 4,934,099

[45] Date of Patent: Jun. 19, 1990

[54] AUTOMOTIVE DOOR WINDOW REGULATOR AND METHOD FOR MOUNTING THE SAME TO AUTOMOTIVE DOOR

[75] Inventors: Junichi Maekawa; Hirotaka Nishizima; Kishiro Muroi, all of Yokohama, Japan

[73] Assignee: Ohi Siesakusho Co., Ltd., Yokohama, Japan

[21] Appl. No.: 379,119

[22] Filed: Jul. 13, 1989

[30] Foreign Application Priority Data

Jul. 15, 1988 [JP] Japan .................. 63-175138
Jul. 15, 1988 [JP] Japan .................. 63-175139

[51] Int. Cl.⁵ ............................................. E05F 11/48
[52] U.S. Cl. ........................................ 49/352; 49/349; 49/502; 49/506
[58] Field of Search ............... 49/352, 349, 362, 360, 49/506, 502; 296/146

[56] References Cited

U.S. PATENT DOCUMENTS

| | | | |
|---|---|---|---|
| 4,483,100 | 11/1984 | Blankenburg et al. | 49/352 |
| 4,769,951 | 9/1988 | Kaaden | 49/502 |
| 4,785,585 | 11/1988 | Grier et al. | 49/349 X |
| 4,793,099 | 12/1988 | Friese et al. | 49/352 X |

FOREIGN PATENT DOCUMENTS 188212 7/1986 European Pat. Off. .............. 49/352
59-153617 9/1984 Japan .

*Primary Examiner*—Philip C. Kannan
*Attorney, Agent, or Firm*—Foley & Lardner, Schwartz, Jeffery, Schwaab, Mack, Blumenthal & Evans

[57] ABSTRACT

Herein disclosed is a window regulator for regulating a glass pane, which comprises a guide rail including front and rear vertical parts and a horizontal part which extends between the front and rear vertical parts to constitute a generally U-shaped structure of the guide rail; front and rear holders slidably guided by the front and rear vertical parts of the guide rail; a first structure securing each of the front and rear holders to the window pane; a second structure for defining in the guide rail two cable guide grooves which extend throughout the entire length of the guide rail; two drive cables axially movably received in the respective cable guide grooves, the drive cables having given portions to which the front and rear holders are connected respectively; and drive means mounted on a given portion of the guide rail for axially moving the two drive cables in opposite directions.

24 Claims, 4 Drawing Sheets

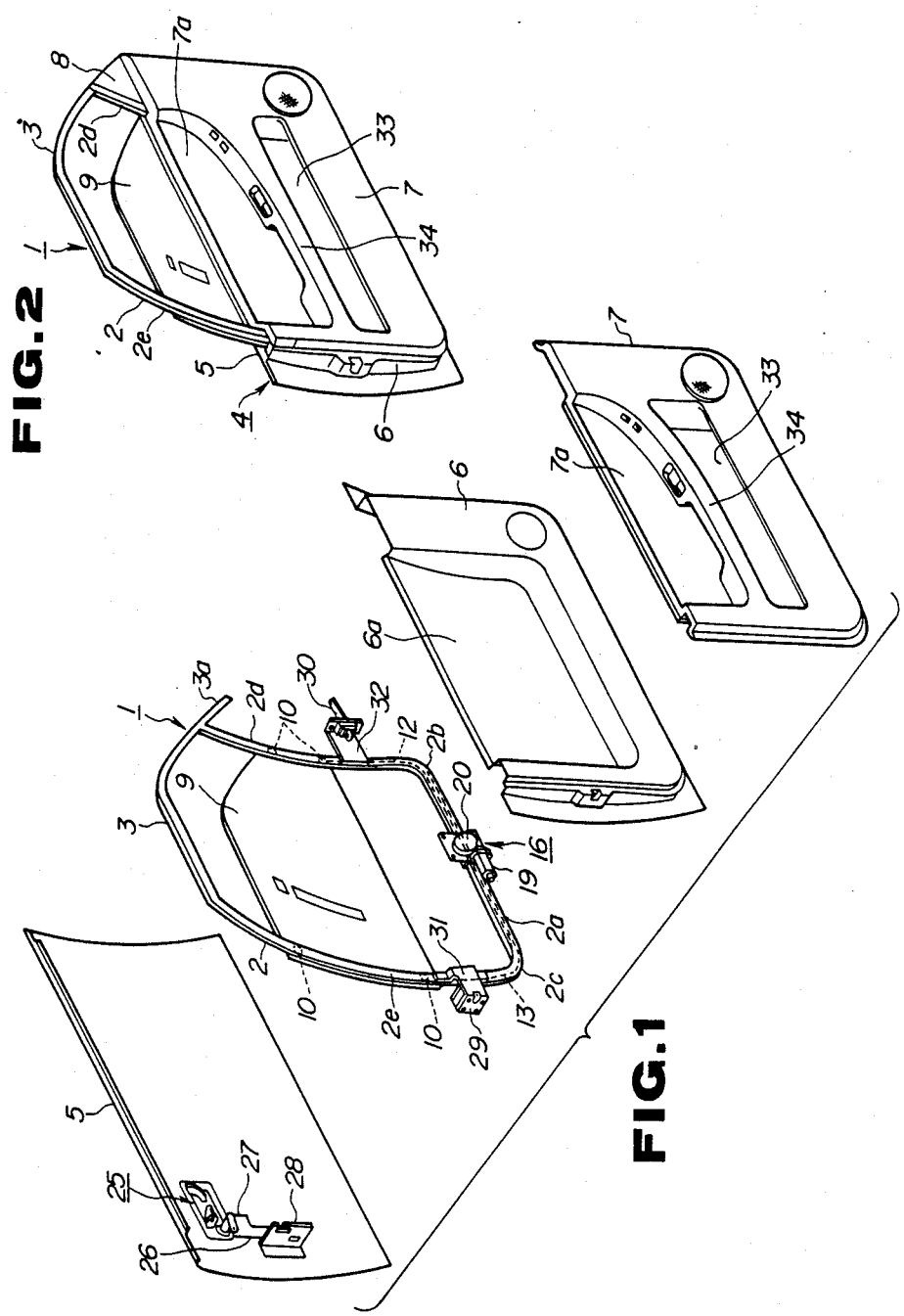

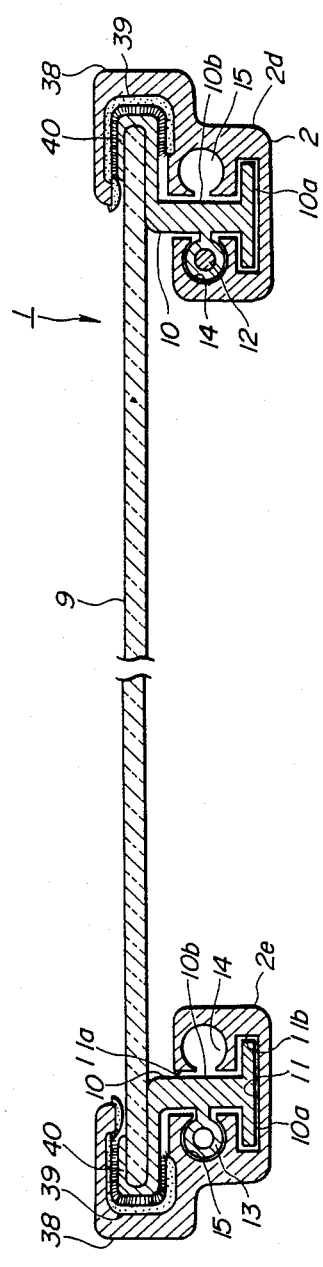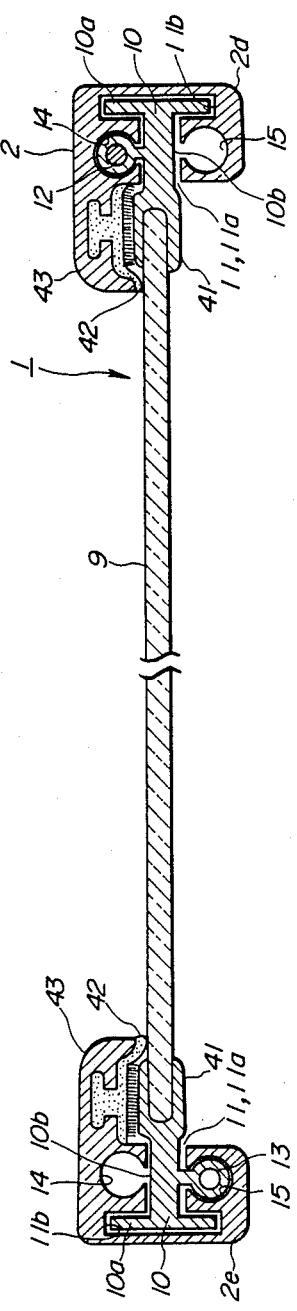

AUTOMOTIVE DOOR WINDOW REGULATOR AND METHOD FOR MOUNTING THE SAME TO AUTOMOTIVE DOOR

BACKGROUND OF THE INVENTION

1. Field of the Invention

The present invention relates to an automotive door window regulator and a method for mounting the regulator to an automotive door.

2. Description of the Prior Art

In order to clarify the task of the present invention, one conventional automotive door window regulator disclosed in Japanese Patent First Provisional Publication No. 59-153617 will be described in the following.

The regulator of the publication comprises vertical guide rails adapted to be mounted in a middle portion of a door proper. A carrier plate is slidably guided by the guide rails. A glass pane has at its lower edge a glass pane holder bolted to the carrier plate. A cable winder is located near the guide rails. Pull-up and pull-down drive cables from the cable winder are arranged to surround the guide rails and fixed at their leading ends to the carrier plate. Thus, when the cable winder is operated to drive the pull-up and pull-down drive cables, the carrier plate is moved upward or downward together with the glass plane along the vertical guide rails.

In order to mount the window regulator to the door, the following steps have been taken.

The guide rails, carrier plate and cable winder are mounted on a sub-panel. The sub-panel is then mounted to an inner panel of the door in a manner to cover a large-sized aperture which has been previously formed in the inner panel. The glass pane is then inserted into the door through a slit defined between the inner and outer panels of the door and bolted at its lower end to the carrier plate through the glass pane holder. The bolting of the glass pane to the carrier plate is carried out by inserting an operating tool into the door through a small working aperture formed in the sub-panel.

However the above-mentioned door window regulator has the following drawbacks due to its inherent construction.

First, since the essential parts of the window regulator are located at the generally middle portion of the door in a manner to overlap each other, the thickness of the door is inevitably increased, particularly at the middle portion of the door. This makes difficult or at least troublesome to provide the door with a sufficiently large inside recess which, when the door is closed, faces the interior of the vehicle. In fact, the doors of modern cars tend to have an inside board recessed for providing a pocket or the like.

Second, the work for mounting the heavy glass pane to the door is very difficult. That is, as is described hereinabove, for the assembly, the glass pane is inserted into the door through the slit between the inner and outer panels of the door and then the glass pane is bolted to the carrier plate with an aid of the operating tool passed through the small working aperture of the sub-panel. In fact, the operator has to work blindly to couple the glass pane with the carrier. Obviously, this is very troublesome and difficult.

SUMMARY OF THE INVENTION

It is therefore an object of the present invention to provide an automotive door window regulator which is free of the above-mentioned drawbacks.

It is another object of the present invention to provide a method for mounting the window regulator to a door, which method induces an excellent labour effectiveness.

According to the present invention, there is provided an automotive door window regulator which can be mounted in a relatively thin door.

According to the present invention, there is provided an automotive door window regulator which is suitable for a door which has an inside board recessed.

According to the present invention, there is provided a window regulator which comprises a guide rail including front and rear vertical parts and a horizontal part which extends between the front and rear vertical parts to constitute a generally U-shaped structure of the guide rail; front and rear holders slidably guided by the front and rear vertical parts of the guide rail; first means securing each of the front and rear holders to the window pane; second means defining in the guide rail two cable guide grooves which extend throughout the entire length of the guide rail; two drive cables axially movably received in the respective cable guide grooves, the drive cables having given portions to which the front and rear holders are connected respectively; and drive means mounted on a given portion of the guide rail for axially moving the two drive cables in opposite directions.

According to the present invention, there is provided a method of mounting a window regulator to an automotive door, the automotive door including inner and outer panels, the method comprising by steps: (a) mounting two drive cables, drive means, glass holders and a glass pane to a guide rail; (b) mounting the guide rail to one of the inner and outer panels to provide a sub-assembly; (c) mounting the sub-assembly to the other of the inner and outer panels having the guide rail put therebetween; and (d) securing the peripheral portions of the inner and outer panels.

According to the present invention, there is provided an automotive door assembly which comprises an outer panel; an inner panel having peripheral portions secured to those of the outer panel; and a window regulator interposed between the outer and outer panels, the window regulator comprising a guide rail including front and rear vertical parts and a horizontal part which extends between the front and rear vertical parts to constitute a generally U-shaped structure of the guide rail, front and rear holders slidably guided by the front and rear vertical parts of the guide rail, first means securing each of the front and rear holders to a window pane, second means defining in the guide rail two cable guide grooves which extend throughout the entire length of the guide rail, two drive cables axially movably received in the respective cable guide grooves, the drive cables having given portions to which the front and rear holders are connected respectively, and drive means mounted on a given portion of the guide rail for axially moving the two drive cables in opposite directions.

BRIEF DESCRIPTION OF THE DRAWINGS

Other objects and advantages of the present invention will become apparent from the following description when taken in conjunction with the accompanying drawings, in which:

FIG. 1 is an exploded view of an automotive door to which a first embodiment of a window regulator of the present invention is applied;

FIG. 2 is a perspective view of the automotive door in an assembled condition;

FIG. 7 is a sectional view similar to FIG. 3, but showing a third embodiment of the present invention; and FIG. 8 is a sectional view similar to FIG. 3, but showing a fourth embodiment of the present invention.

DETAILED DESCRIPTION OF THE INVENTION

Figure 3:
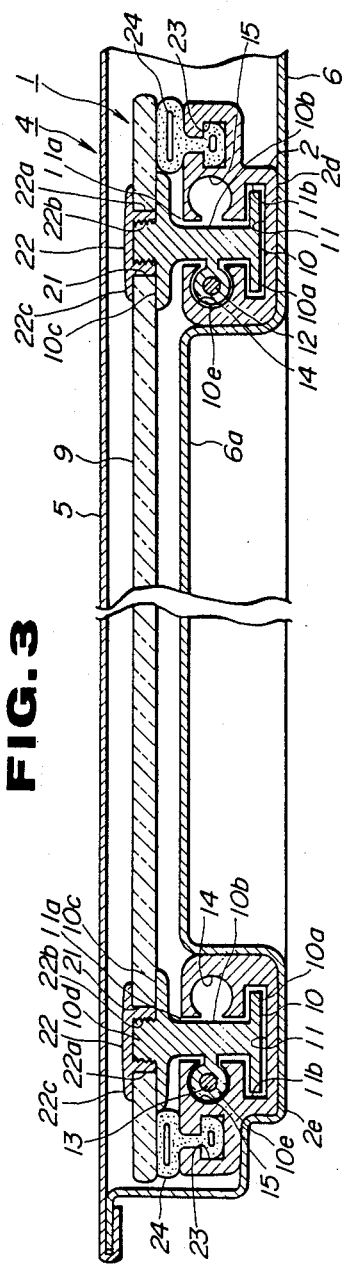
FIG. 3 is horizontally sectional view of the door at the part where an essential portion of the window regulator is positioned.

Referring to FIGS. 1 to 5, particularly FIG. 1, there is shown, but in an exploded fashion, an automotive door to which a first embodiment of the invention is applied.

As is seen from FIG. 1, the window regulator 1 comprises a generally U-shaped guide rail 2 which thus includes a generally horizontal lower part 2a and front and rear generally vertical parts 2d and 2e, each being connected to a front or rear end of the horizontal lower part 2a through a curved junction part 2b or 2c.

A slightly bent bridge member 3 extends between respective upper ends of the front and rear vertical parts 2d and 2e of the guide rail 2, as shown.

As may be understood from FIG. 2, the bridge member 3 and the upper halves of the front and rear vertical parts 2d and 2e are projected upward from a door proper 4 to constitute a glass pane sash. The door 4 comprises an outer panel 5, an inner panel 6 and a door trim 7. Designated by numeral 8 is a triangular cover which covers a front projection 3a (see FIG. 1) of the bridge member 3.

The guide rail 2 has a uniform cross section throughout the entire length thereof. The front and rear vertical parts 2d and 2e of the guide rail 2 have each two holders 10 slidably guided thereby. These two pairs of holders 10 are secured to front and rear edges of a glass pane 9, so that the glass pane 9 can move upward and downward along the front and rear vertical parts 2d and 2e.

As is seen from FIG. 3, for the guided movement of the holders 10, the guide rail 2 has a guide groove 11 formed therethroughout. The guide groove 11 has a generally T-shaped cross section, comprising a narrow portion 11a which is opened to the outside and an enlarged bottom portion 11b which is merged at its middle part with the narrow portion 11a.

The guide rail 2 is formed at opposed side walls with cylindrical cable guide grooves 14 and 15 which are merged with the narrow portion 11a of the guide groove 11. The guide grooves 14 and 15 have respective drive cables 12 and 13 axially slidably received therein.

Figure 5:
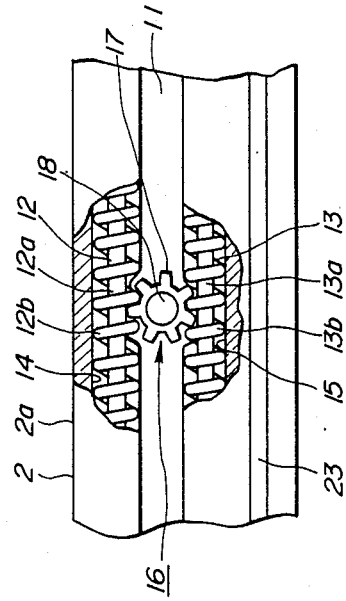
FIG. 5 is a partially broken view taken from the direction of the line V—V of FIG. 4.
Figure 4:
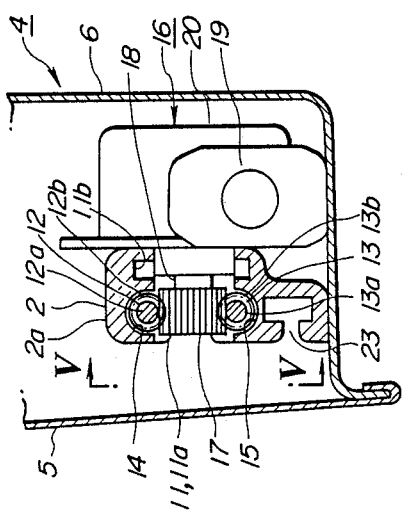
FIG. 4 is a vertically sectional view of a drive device employed, in the window regulator.

As is seen from FIGS. 4 and 5, each drive cable 12 or 13 is of a so-called geared cable which comprises a core cable 12a or 13a of hard steel and a spiral wire 12b or 13b spirally wound about the core cable 12a or 13a. The geared cable is flexible but has a considerable resistance against compression and extension stress axially applied thereto.

As is seen from FIGS. 1, 4 and 5, the horizontal lower part 2a of the guide rail 2 has at its generally middle portion a drive device 16 which drives the drive cables 12 and 13 in opposite directions.

As is seen from FIGS. 4 and 5, the drive device 16 comprises a pinion 17 which is installed in the narrow portion 11a of the guide groove 11 having its diametrically opposed gears meshed with the drive cables 12 and 13, a shaft 18 which is connected to the center of the pinion 17 to rotate therewith, an electric motor 19 which is mounted on the guide rail 2 and a speed reduction gear 20 which is operatively interposed between the electric motor 19 and the shaft 18. Thus, upon energization of the electric motor 19, the pinion 17 is rotated in one or the other direction to drive the geared cables 12 and 13 in and along the associated guide grooves 14 and 15 in opposite directions.

As is seen from FIG. 3, the lower holders 10 which support the lower portions of the glass pane 9 (see FIG. 1) and are slidably engaged with the front and rear vertical parts 2d and 2e of the guide rail 2 comprise each an enlarged base portion 10a which is slidably received in the enlarged bottom portion 11b of the guide groove 11, a shank portion 10b which is integral with the base portion 10a and slidably received in the narrow portion 11a of the guide groove 11, a circular seat portion 10c which is integrally connected to an outwardly projected end of the shank portion 10b and attached to an inner surface of the glass pane 9, an externally threaded boss 10d which is integrally mounted on a center of the circular seat portion 10c and spacedly put in a bore 21 formed in the glass pane 9, and a cable gripping portion 10e which is integral with the shank portion 10b and projected into the cable guide groove 14 or 15 to grip an end of the geared cable 12 or 13.

The upper holders 10 which support the upper portions of the glass pane 9 are the same in construction as the above-mentioned lower holders 10. However, if desired, the cable gripping portions 10e may be omitted.

Caps 22 are further used for detachably connecting the glass pane 9 to the upper and lower holders 10. Each cap 22 comprises an enlarged cover portion 22c which contacts an outer surface of the glass pane 9 and an internally threaded tubular portion 22a which is put in the bore 21 of the glass pane 9 to tightly engage with the externally threaded boss 10d of the associated holder 10. Designated by numeral 22b is the internal thread of the tubular portion 22a of the cap 22. Thus, the glass pane 9 is slidably guided by the front and rear vertical parts 2d and 2e of the guide rail 2 through the four holders 10.

When, thus, the drive device 16 is energized to drive the drive cables 12 and 13 along the guide rail 2, the glass pane 9 is moved between its lowermost position wherein the glass pane 9 is fully received in the door proper 4 and its uppermost position wherein the upper edge of the glass pane 9 abuts against the bridge member 3 of the guide rail 2.

As is seen from FIG. 3, elongate sealing members 24 are secured to the outside surfaces of the front and rear vertical parts 2d and 2e of the guide rail 2 to assure watertight sealing between the glass pane 9 and the guide rail 2. For securing the sealing members 24 to the guide rail 2, each sealing member 24 has an enlarged base portion (no numeral) plugged in a groove 23 formed in the guide rail 2.

In the following, the steps for mounting the window regulator 1 to the automotive door 4 will be described with reference to FIG. 1.

Prior to the mounting, an outside handle device 25, two rods 26 and 27 which extend from the handle device and are to be linked to an after-mentioned door lock 29 and a bracket 28 which supports leading ends of the rods 26 and 27 have been all mounted on an inner surface of the outer panel 5. The supporting of the leading ends of the rods 26 and 27 by the bracket 28 has been so made as to facilitate a subsequent proper engagement with the door lock 29. The window regulator 1 has been assembled in the afore-mentioned manner, which thus comprises the guide rail 2, the drive cables 12 and 13, the drive means 16, glass pane holders 10 and the glass pane 9.

The door lock 29 and a check link device 30 are mounted to predetermined positions of the guide rail 2 through respective brackets 31 and 32.

Then, the assembled window regulator 1 is mounted to the inner panel 6 in such a manner that a lower half portion of the guide rail 2 snugly receives therein an outwardly depressed part 6a of the inner panel 6. Then, having the door lock 29 and the check link device 30 located at proper positions of the inner panel 6, these parts and the guide rail 2 are secured to the inner panel 6 by means of bolts, welding or the like.

Then, the inner panel 6 which thus carries thereon the window regulator 1 is coupled with the outer panel 5 having the window regulator 1 put therebetween. During this, the leading ends of the two rods 26 and 27 from the outside handle device 25 are brought into engagement with the door lock 29. Then, the peripheral portions of the inner and outer panels 6 and 5 are secured by means of bolts, welding or the like. If the connection of the inner and outer panels 6 and 5 is made by threaded bolts, repair and inspection of the window regulator 1 are readily carried out.

Then, a door trim 7 is mounted to the inner panel 6 in such a manner that an outwardly depressed part 7a of the door trim 7 is snugly put in the depressed part 6a the inner panel 6, and the door trim 7 is secured to the inner panel 6 by means of bolts or the like.

As shown, the depressed part 7a of the door trim 7 defines a pocket 33 at its lower part. An arm rest 34 is provided which extends across the depressed part 7a. The upper depressed space defined above the arm rest 34 is so sized as to receive an arm of a passenger.

As will be understood from the foregoing description, in accordance with the first embodiment of the present invention, the following advantages are given.

First, since the essential parts of the window regulator 1 are not collected at a limited space, the thickness of the window regulator 1 can be reduced. This induces not only reduction in thickness of a door assembly but also facilitation of providing the inner panel 6 and the door trim 7 with the multi-usable depressed parts 6a and 7a.

Second, since the assembly of the door can be carried out in the afore-mentioned simple steps, the labor effectiveness is very improved. In fact, in the invention, there is no need of the afore-mentioned "blind work" for bolting the glass pane to the carrier plate.

Figure 6:
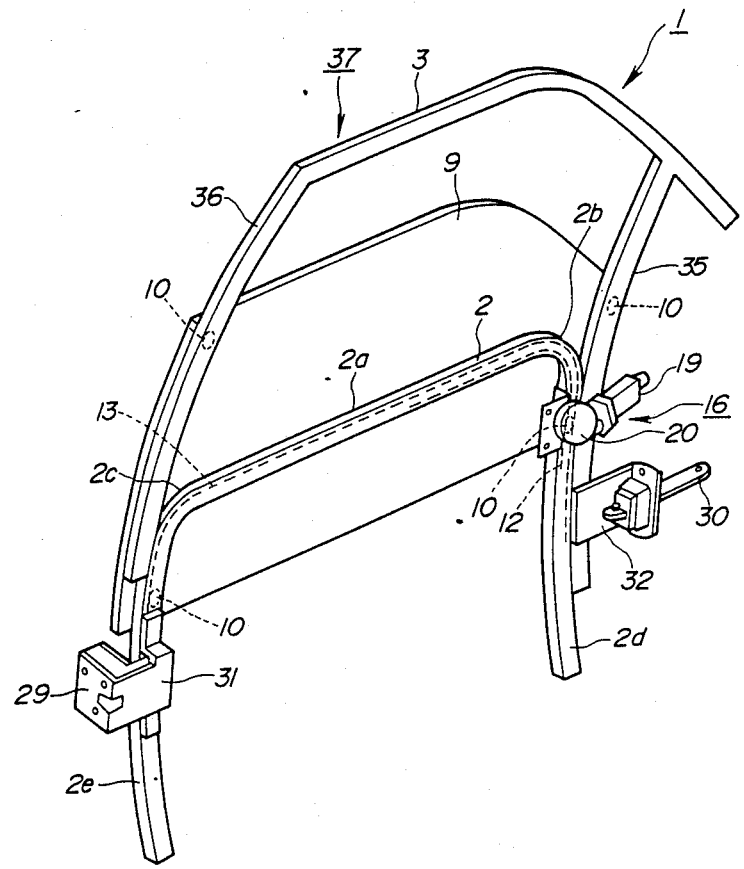
FIG. 6 is a perspective view of a second embodiment of a window regulator of the present invention.

Referring to FIG. 6, there is shown a second embodiment of a window regulator of the present invention. For facilitation of the description, identical parts to those in the afore-mentioned first embodiment are designated by the same numerals and detailed explanation of them will be omitted from the following description.

In this second embodiment, separate front and rear vertical guide rails 35 and 36 are employed for guiding the movement of a glass pane 9. A bridge member 3 extends between the upper ends of the front and rear guide rails 35 and 36 to constitute a glass pane sash 37. Upper holders 10 secured to the upper portions of the glass pane 9 are slidably guided by the respective guide rails 35 and 36.

A reversed generally U-shaped guide rail 2 is secured to lower portions of the front and rear vertical guide rails 35 and 36. The guide rail 2 thus includes a generally horizontal upper part 2a and front and rear generally vertical parts 2d and 2e, each being connected to a front or rear end of the upper part 2a through a curved junction part 2b or 2c. As shown in the drawing, the upper portion of the reversed U-shaped guide rail 2 is put between the lower portions of the front and rear vertical guide rails 35 and 36 and secured to the same by welding or the like.

It is to be noted that the U-shaped guide rail 2 has a guide groove which is identical to the guide groove 11 of the afore-mentioned first embodiment. Lower holders 10 are slidably guided by the front and rear vertical parts 2d and 2e of the guide rail 2 respectively. Leading ends of the geared drive cables 12 and 13 are connected to the lower holders 10.

As shown in the drawing, a drive device 16 for driving the drive cables 12 and 13 in opposite directions is mounted to an upper portion of the front vertical part 2d of the guide rail 2. It is to be noted that the drive device 16 is so arranged as to project toward the front of the guide rail 2.

Upon energization of the drive device 16, the drive cables 12 and 13 move along the guide rail 2 in opposite directions thereby moving the glass pane 9 upward and downward through the lower holders 10.

In this second embodiment, only the glass pane 9 and the horizontal upper part 2a of the guide rail 2 are positioned at the middle portion of the door. Thus, similar to the first embodiment, the thickness of the window regulator can be reduced. Furthermore, because of the same reason as has been described in the first embodiment, the mounting of the window regulator to the door can be easily carried out without forcing an operator to work blindly.

Referring to FIG. 7, there is shown a third embodiment of a window regulator of the present invention. The window regulator of this embodiment is identical to that of the afore-mentioned first embodiment except the following construction.

That is, in the third embodiment, each lower holder 10 comprises an enlarged base portion 10a which is slidably received in the enlarged bottom portion 11b of the guide groove 11, a shank portion 10b which is slidably received in the narrow portion 11a of the guide groove 11 and a generally U-shaped grip portion 40 which is projected outward from the guide groove 11 and grips a lower edge portion of the glass pane 9. Each of the front and rear vertical parts 2d and 2e of the guide rail 2 has a glass guide part 38 integral thereto. The glass guide part 38 has an elongate groove (no numeral) which extends along the guide rail 2 for slidably receiving the front or rear edge of the glass pane 9. Designated by numeral 39 is glass runner received in the elongate groove of the glass guide part 38.

With provision of the glass guide parts 38, the upward and downward guided movement of the glass pane 9 is much assured, and the front and rear edges of the glass pane 9 can be protected from foreign things.

Referring to FIG. 8, there is shown a fourth embodiment of a window regulator of the present invention.

As shown in the drawing, the guide rail 2 used in this fourth embodiment is arranged to enclose the glass pane 9. That is, the front and rear vertical parts 2d and 2e of the generally U-shaped guide rail 2 have guide grooves 11 which face each other. Each lower holder 10 has an outwardly projected gripping portion 41 by which a lower portion of the front or rear edge of the glass pane 9 is gripped. The guide rail 2 has an extension 43 integral thereto, which covers an outside peripheral portion of the glass pane 9, as shown. Designated by numeral 42 is an elongate sealing member which is held by the extension 43 and sealingly contacts the peripheral portion of the glass pane 9.

In this fourth embodiment, the cable guide grooves 14 and 15 and the drive cables 12 and 13 slidably received in the guide grooves 14 and 15 are symmetrically arranged with respect to the glass pane 9, so that the drive force produced by the drive means 16 is evenly applied to the drive cables 12 and 13 thereby smoothing the upward and downward movement of the glass pane 9.

In the present invention, the following modifications are available.

(1) The two upper holders 10 of the first embodiment may be omitted. In this case, however, each of the two lower holders 10 has a considerable vertical length to prevent outward tilting of the glass pane 9.

(2) The upper half portion of the guide rail 2 and the bridge member 3 of the first embodiment and the front and rear vertical guide rails 35 and 36 and the bridge member 3 of the second embodiment may be omitted. With this, a so-called "sashless door" is provided. In this case, vertically elongated lower holders are used for assuredly holding the glass pane 9 relative to the remaining guide rail.

(3) In the first embodiment, the drive device 16 may be mounted to a lower portion of the front or rear vertical part 2d or 2e of the guide rail 2.

(4) During assembly of the door, the window regulator 1 may be mounted to the outer panel 5 and then the inner panel 6 may be mounted to the outer panel 5 having the window regulator 1 put therebetween.

What is claimed is:

1. A window regulator for regulating a window pane, comprising:
    a guide rail including front and rear vertical parts and a horizontal part which extends between the front and rear vertical parts to constitute a generally U-shaped structure of the guide rail;
    front and rear holders slidably guided by said front and rear vertical parts of said guide rail;
    first means securing each of said front and rear holders to said window pane;
    second means defining in said guide rail two cable guide grooves which extend throughout the entire length of the guide rail;
    two drive cables axially movably received in the respective cable guide grooves, said drive cables having given portions to which said front and rear holders are connected respectively; and
    drive means mounted on a given portion of said guide rail for axially moving said two drive cables in opposite directions.

2. A window regulator as claimed in claim 1, in which said horizontal part of said guide rail extends between lower ends of said front and rear vertical parts of said guide rail.

3. A window regulator as claimed in claim 2, in which said horizontal part of said guide rail has a generally middle portion to which said drive means is mounted.

4. A window regulator as claimed in claim 1, in which said guide rail has a holder guide groove formed throughout the entire length thereof, and in which each of said front and rear holders has a base portion slidably received in said holder guide groove of said guide rail.

5. A window regulator as claimed in claim 4, in which said first means comprises:
    means defining in said glass pane a bore;
    a circular seat portion of each holder, which is projected outwardly from said holder guide groove of said guide rail and contacts one surface of said glass pane, said seat portion having an externally threaded boss spacedly put in said bore of said glass panel; and
    a cap having an internally threaded tubular portion, said cap contacting the other surface of said glass pane having said internally threaded tubular portion tightly engaged with said externally threaded boss of said circular seat portion.

6. A window regulator as claimed in claim 4, in which said holder guide groove includes an enlarged bottom portion in which an enlarged base portion of each holder is slidably received to achieve a slidable interlocking therebetween.

7. A window regulator as claimed in claim 6, in which said cable guide grooves are arranged to face each other having said holder guide groove put therebetween.

8. A window regulator as claimed in claim 7, in which said cable guide grooves are merged with said holder guide groove.

9. A window regulator as claimed in claim 8, in which each of said drive cables is of a geared cable, and in which said drive means comprises a pinion meshed with said two geared drive cables, an electric motor for driving the pinion and a speed reduction gear operatively interposed between said electric motor and said pinion.

10. A window regulator as claimed in claim 9, further comprising front and rear additional holders which are secured to said glass pane and slidably guided by said front and rear vertical parts of said guide rail, respectively.

11. A window regulator as claimed in claim 10, further comprising an elongate sealing member which is secured to the outside surface of the guide rail to assure watertight sealing between the glass pane and the guide rail.

12. A window regulator as claimed in claim 11, in which said sealing member has an enlarged base portion plugged in a groove formed in said guide rail.

13. A window regulator as claimed in claim 8, further comprising:
    front and rear vertical guide rails which extend upward from said first and second vertical parts of said guide rail, each vertical guide rail having a guide groove formed throughout the entire length thereof;

additional front and rear holders secured to said glass pane and slidably guided by said front and rear vertical guide rails; and a bridge member extending between upper ends of said front and rear vertical guide rails to constitute a sash for the glass pane.

14. A window regulator as claimed in claim 13, in which said horizontal part of said guide rail extends between upper ends of said front and rear vertical parts of said guide rail.

15. A window regulator as claimed in claim 14, in which said drive means is mounted to an upper part of said front vertical part of said guide rail.

16. A window regulator as claimed in claim 8, in which said first means comprises a generally U-shaped grip portion which is integral with said holder and projected outwardly from the holder guide groove, said grip portion gripping a side edge of said glass pane.

17. A window regulator as claimed in claim 16, in which said guide rail is integrally formed with a glass guide part 38 which has an elongate guide groove in and along which a side edge of the glass pane is slidably received.

18. A window regulator as claimed in claim 17, in which said elongate guide groove has a glass runner fixed thereto for smoothing the movement of the glass pane relative to the guide rail.

19. A window regulator as claimed in claim 8, in which said guide rail is arranged to enclose said glass pane, and in which said guide grooves of said first and second vertical parts of said guide groove face each other.

20. A method of mounting a window regulator to an automotive door, said automotive door including inner and outer panels, said method comprising by steps:
(a) mounting two drive cables, drive means, glass holders and a glass pane to a guide rail;
(b) mounting said guide rail to one of said inner and outer panels to provide a sub-assembly;
(c) mounting said sub-assembly to the other of said inner and outer panels having said guide rail put therebetween; and
(d) securing the peripheral portions of said inner and outer panels.

21. A method as claimed in claim 20, in which before the step (a), a door lock and a check link device are mounted to said guide rail.

22. An automotive door assembly comprising:
an outer panel;
an inner panel having peripheral portions secured to those of said outer panel; and
a window regulator interposed between said outer and outer panels, said window regulator comprising a guide rail including front and rear vertical parts and a horizontal part which extends between the front and rear vertical parts to constitute a generally U-shaped structure of the guide rail, front and rear holders slidably guided by said front and rear vertical parts of said guide rail, first means securing each of said front and rear holders to a window pane, second means defining in said guide rail two cable guide grooves which extend throughout the entire length of the guide rail, two drive cables axially movably received in the respective cable guide grooves, said drive cables having given portions to which said front and rear holders are connected respectively, and drive means mounted on a given portion of said guide rail for axially moving said two drive cables in opposite directions.

23. An automotive door assembly as claimed in claim 22, in which said inner panel is formed with an outwardly depressed part, said depressed part being snugly received in a lower half portion of said generally U-shaped structure of the guide rail.

24. An automotive door assembly as claimed in claim 23, further comprising a door trim which is formed with an outwardly depressed part, said part being snugly received in said depressed part of said inner panel.

* * * * *